(12) United States Patent
Fan

(10) Patent No.: US 8,105,474 B2
(45) Date of Patent: *Jan. 31, 2012

(54) PHOTO-ELECTRO-REFINING OF BIO-OIL TO BIOFUEL AND HYDROGEN

(75) Inventor: Qinbai Fan, Chicago, IL (US)

(73) Assignee: Gas Technology Institute, Des Plaines, IL (US)

(*) Notice: Subject to any disclaimer, the term of this patent is extended or adjusted under 35 U.S.C. 154(b) by 351 days.

This patent is subject to a terminal disclaimer.

(21) Appl. No.: 12/542,778

(22) Filed: Aug. 18, 2009

(65) Prior Publication Data

US 2011/0042229 A1 Feb. 24, 2011

(51) Int. Cl.
*C25B 1/02* (2006.01)
*C25B 3/00* (2006.01)
(52) U.S. Cl. .................... 205/340; 205/413
(58) Field of Classification Search .............. 204/263; 205/340, 413
See application file for complete search history.

(56) References Cited

U.S. PATENT DOCUMENTS

| | | | |
|---|---|---|---|
| 4,094,751 A * | 6/1978 | Nozik | 205/638 |
| 4,181,593 A | 1/1980 | McKinzie et al. | |
| 4,215,155 A | 7/1980 | McKinzie et al. | |
| 4,303,486 A * | 12/1981 | Bard et al. | 204/157.47 |
| 4,427,749 A * | 1/1984 | Graetzel et al. | 205/340 |
| 4,437,954 A * | 3/1984 | Sammells et al. | 205/340 |
| 5,660,940 A * | 8/1997 | Larsson et al. | 429/401 |
| 6,117,337 A * | 9/2000 | Gonzalez-Martin et al. | 422/186.3 |
| 6,238,543 B1 | 5/2001 | Law, Jr. et al. | |
| 6,964,758 B2 * | 11/2005 | Cortright et al. | 423/648.1 |
| 7,006,898 B2 * | 2/2006 | Barbir et al. | 429/429 |
| 7,037,414 B2 | 5/2006 | Fan | |
| 7,129,000 B2 * | 10/2006 | Sotomura et al. | 429/105 |
| 7,241,950 B2 | 7/2007 | Fan et al. | |
| 7,419,580 B2 * | 9/2008 | Chan et al. | 205/343 |
| 7,491,858 B2 * | 2/2009 | Murzin et al. | 204/157.15 |
| 2003/0121481 A1 * | 7/2003 | Dodd et al. | 123/3 |
| 2004/0137290 A1 * | 7/2004 | Woods et al. | 204/263 |
| 2005/0112425 A1 * | 5/2005 | Hsu | 429/21 |
| 2007/0119718 A1 * | 5/2007 | Gibson et al. | 205/637 |
| 2007/0184309 A1 * | 8/2007 | Gust, Jr. et al. | 429/2 |
| 2008/0118429 A1 * | 5/2008 | Abbas et al. | 422/129 |
| 2009/0050193 A1 * | 2/2009 | Kaneko | 136/248 |
| 2009/0061267 A1 * | 3/2009 | Monzyk et al. | 205/455 |

OTHER PUBLICATIONS

Fu et al, "Photocatalytic reforming of biomass: A systematic study of hydrogen evolution from glucose solution," Int'l J. of Hydrogen Energy 33,(2008), pp. 6484-6491.*

Kawai et al, "Conversion of carbohydrate into hydrogen fuel by a photocatalytic process," Nature v. 286, Jul. 31, 1980, pp. 474-476.*

(Continued)

*Primary Examiner* — Keith Hendricks
*Assistant Examiner* — Colleen M Raphael
(74) *Attorney, Agent, or Firm* — Mark E Fejer

(57) ABSTRACT

An electrochemical device having a proton exchange membrane disposed between an anode electrode and a cathode electrode, an anode plate adjacent the anode electrode and forming at least one anode flow channel, and a cathode plate adjacent the cathode electrode and forming at least one cathode flow channel, in which a bio-oil is introduced into the at least one anode flow channel, and a carbohydrate is introduced into the at least one cathode flow channel. The bio-oil is oxidized at the anode, producing the biofuel, and protons from the anode electrode migrate to the cathode electrode and are reduced to hydrogen and/or reacted with the carbohydrate at the cathode, producing hydrogen and carbon-hydrogen biofuel.

10 Claims, 4 Drawing Sheets

OTHER PUBLICATIONS

St. John et al, "Hydrogen generation by photocatalytic oxidation of glucose by platinized n-TiO2 powder," J. Phys. Chem 1983, vol. 87, pp. 801-805.*

Ye et al, "High efficient production of hydrogen from bio-oil using low-temperature electrochemical catalytic reforming approach over NiCuZn-Al2O3 catalyst," Catalysis Letters (2009), 127:323-333, published online Nov. 11, 2008.*

Manriquezs, J. et al., "Electrocatalysis of the oxidation of alcohol and phenol derivative pollutants at vitreous carbon electrode coated by nickel macrocyclic complex-based films", Analytica Chimica Acta 378 (1999) 159-168.

Bach, U. et al., "Solid-state dye-sensitized mesoporous TiO2 solar cells with high proton-to-electron conversion efficiencies", Nature, vol. 395, (Oct. 8, 1998), 583-585.

Park, Jong Hyeok et al., "Photoelectrochemical tandem cell with bipolar dye-sensitized electrodes for vectorial electron transfer for water splitting", Electrochemical and Solid-State Letters, 9 (2) E5-E8, (2006).

* cited by examiner

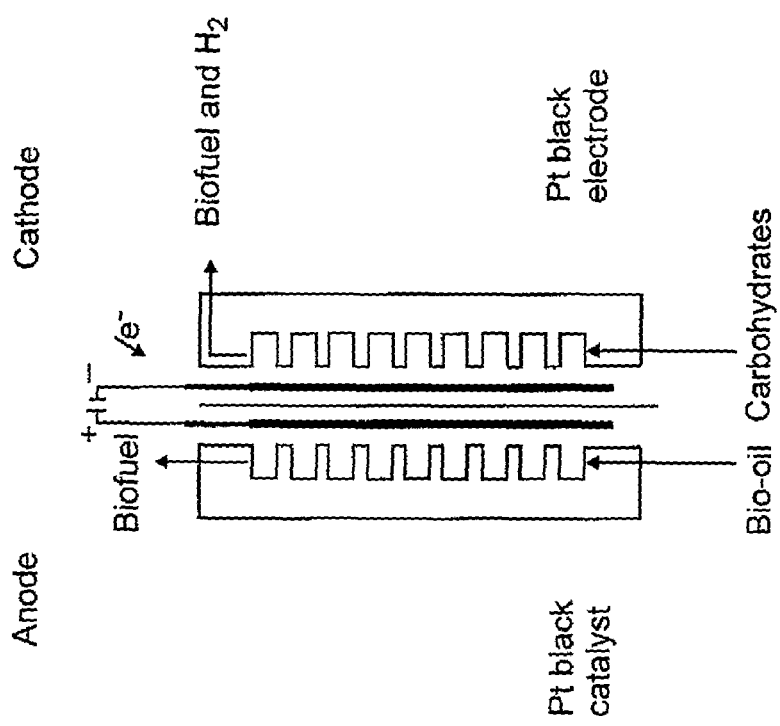

PHOTO-ELECTRO-REFINING OF BIO-OIL TO BIOFUEL AND HYDROGEN

BACKGROUND OF THE INVENTION

1. Field of the Invention

This invention relates to a method and apparatus for producing biofuels. In one aspect, this invention relates to a method and apparatus for producing biofuels from bio-oil, for example, animal fat. In one aspect, this invention relates to an electrochemical method and apparatus for producing biofuels. In one aspect, this invention relates to a photo electrochemical method and apparatus for producing biofuels.

2. Description of Related Art

Bio-oil is a biomass-derived synthetic liquid fuel used as a substitute for petroleum which is typically produced by pyrolysis of biomass. Bio-oil includes bio-crude, which contains high oxygen content, water, and carboxylic groups. By way of example, bio-crude could be vegetable oil, animal fat, and the like.

Biofuel is a solid, liquid, or gaseous fuel obtained from relatively recently lifeless or living biological material and is different from fossil fuels, which are derived from long dead biological materials. Biofuel is a clean form of bio-oil and is suitable for direct use.

Photoelectrochemistry is the study of the interaction of light (in particular, radiation in the "sunlight" region, about 87 to 308 kJ/mole or about 0.9 to about 3.2 eV per photon) with electronic flow and chemical reactions at the electrode surfaces in electrochemical cells. The radiation involved in this process has considerable energy and can be used for the direct production of electricity, the splitting of water into hydrogen and oxygen, referred to as photoelectrolysis, and the treatment of organic species. However, to be practical, efficient and inexpensive systems utilizing readily available materials must be devised for the conversion process. The hindrances to practical applications of the system include the poor stability and low efficiency of the photoelectrode due to photoelectrochemical reactions involving photon-electron transfer and recombination, redox exchange and surface corrosion.

Numerous efforts have been made to enhance the efficiency and stability of photoelectrochemical cells. The general approach has been to coat a layer of protective materials, which may be organic substances, active metal ions, noble metals, light sensitive dyes and more stable semiconductors, such as metal oxides, onto the photoelectrode surface. Recent developments include a thin film dye to sensitize the semiconductor electrodes in photoelectrochemical cells.

U.S. Pat. No. 7,037,414 teaches a photoelectrochemical cell comprising a light transmissive enclosure, two photoelectrodes, a semiconductor photoanode and a semiconductor photocathode, disposed within the light transmissive enclosure, and an electrolytic solution disposed entirely between the photoelectrodes. Because the electrolytic solution employed in the photoelectrochemical cell is limited to a volume disposed between the photoelectrodes, the sunlight is able to directly shine on the catalyst surfaces of the photoelectrodes to produce hydrogen and oxygen, thereby eliminating solar energy losses due to water (electrolyte) sorption; and because there is no thick water (electrolyte) layer between the sunlight and the catalyst surfaces, the product gases, hydrogen and/or oxygen, are able to leave the catalyst surface easily without any restriction imposed by water surface tension. That is, the three-phase (gas, solid catalyst and liquid electrolyte) area is optimized to increase the solar energy efficiency. The photoelectrodes comprise photo electro-catalysts are bound together by a polymer electrolyte, such as NAFION, a perfluorosulfonic acid polymer available from DuPont, to form a catalyst layer. The polymer electrolyte performs a multitude of functions including gas separation, water containment, proton exchanger and water transporter. The ionomer of the polymer electrolyte in the catalyst layer acts as a capillary channel to transport water to the catalyst surface and as an electron conductor to transport electrons between the two photoelectrodes. In addition, this fully hydrophilic ionomer helps to distribute water to the catalyst surface without blocking the incoming solar energy.

More than 70 different catalytic reactions (oxidations, hydrogenations, dehydrogenations, isomerizations, decompositions) have been electrochemically promoted on Pt, Pd, Rh, Ag, Au, Ni, $IrO_2$, and $RuO_2$ catalysts. The solid electrolytes are $O^{2-}$ conductors, such as $Y_2O_3$ stabilized $ZrO_2$ (YSZ), $H^+$ conductors, such as $CaZr_{0.9}In_{0.1}O_{3-\alpha}$ and NAFION®, $F^-$ conductor ($CaF_2$), and the like. Deoxygenation and decarboxylation are rarely reported at high temperatures with big molecules, for example, chains with more than five carbons. However, in the liquid phase, decarboxylation has been reported. See, for example, U.S. Pat. No. 6,238,543, which teaches a process for electrolytic coupling of carboxylic acids carried out in a polymer electrolyte membrane reactor in which gaseous or neat (i.e. without water) liquid reactants are used without the use of organic co-solvents while preventing the loss of platinum and permitting the use of oxygen reduction to water as the cathode reaction. In this case, the use of a neat organic acid is necessary to prevent oxygen production at the anode electrode. Consequently, the method disclosed therein, which is necessarily carried out at temperatures less than 120° C. due, among other things, to limitations of the NAFION electrolyte employed therein and which requires cell potentials of at least about 3.0 volts, cannot be used for bio-oil treatment due to the presence of about 17% by weight water therein.

SUMMARY OF THE INVENTION

It is one object of this invention to provide an electrochemical method and apparatus for converting bio-oil to biofuel.

It is one object of this invention to provide a method and apparatus for converting bio-oil to bio-fuel by photo-electrorefining using sunlight illumination. These and other objects of this invention are addressed by an electrochemical device comprising a proton exchange membrane disposed between an anode electrode and a cathode electrode, an anode plate adjacent the anode electrode and forming at least one anode flow channel, and a cathode plate adjacent the cathode electrode and forming at least one cathode flow channel, in which a bio-oil is introduced into the at least one anode flow channel, and a carbohydrate is introduced into the at least one cathode flow channel. The bio-oil is oxidized at the anode, producing biofuel, and protons from the anode electrode migrate to the cathode electrode where they are reduced to hydrogen and/or reacted with the carbohydrate at the cathode, producing hydrogen and carbon-hydrogen biofuel in accordance with the following reactions:

At the anode:

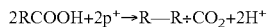
2RCOOH+2p⁺→R—R+CO₂+2H⁺

At the cathode:

2H⁺+2e⁻H₂

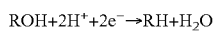
ROH+2H⁺+2e⁻→RH+H₂O where R is a $C_mH_nO_x$ group, where m>0, n>0 and x≧0. Exemplary of such groups are the alkyl, alkene, and aryl groups. In accordance with one particularly preferred embodiment, the electrochemical device is a photoelectrochemical device comprising a photoanode and photocathode (referred to herein as photoelectrodes) in which energy from the sun is used to produce electrons and holes, oxidize a fat acid to produce a carbon-hydrogen chain, i.e. biofuel, at the photoanode and reduce protons from the photoanode to hydrogen or reduce the carbohydrates to a carbon-hydrogen biofuel at the photocathode. In order to overcome oxygen evolution at the photoanode, a high overpotential catalyst for oxygen evolution is co-deposited on a metal oxide semiconductor to enable the fat oxidation for removing the carboxylic group. At the photocathode, protons or carbohydrates, e.g. alcohol, are reduced to produce hydrogen and/or biofuel. The biofuels are hydrophobic and, thus, can easily be separated from the hydrophilic reactants.

BRIEF DESCRIPTION OF THE DRAWINGS

These and other objects and features of this invention will be better understood from the following detailed description taken in conjunction with the drawings, wherein.

FIG. 4 is a diagram showing a bio-oil electro-refining apparatus in accordance with one embodiment of this invention.

DETAILED DESCRIPTION OF THE PRESENTLY PREFERRED EMBODIMENTS

Definitions

As used herein, the term "carbon-hydrogen biofuel" or "hydrogen-carbon biofuel" refers to a fuel derived from biofuel having little or no oxygen content and few or no carboxyl groups, and having a higher heat capacity due to lower oxygen and carboxyl group content than biofuel.

Overpotential is an electrochemical term which refers to the potential (voltage) difference between a half-reaction's thermodynamically determined reduction potential and the potential at which the redox event is experimentally observed. Due to overpotential, the anode electrode of an electrolytic cell is more positive, using more energy than thermodynamically required and the cathode electrode is more negative, using more energy than thermodynamically required. As the overpotential increases, the electrochemical reaction becomes more difficult. As used herein, the term "high overpotential" refers to a condition in which the overpotential is more than the overpotential normally observed for the given reactions. For example, the oxygen evolution thermodynamic potential is 1.23 V, but requires 1.6 V to obtain oxygen on Pt (its normal overpotential). Because bio-oil requires more than 1.6 V to be oxidized, in order to prevent oxygen evolution at voltages greater than 1.6 V, a catalyst with high oxygen overpotential is needed. Thus, with a high oxygen overpotential catalyst, the bio-oil can be oxidized at 2.0 V on the catalyst and oxygen is only evolved at 2.4 V using the same catalyst, and if the voltage is maintained below 2.4 V, the bio-fuel can be produced efficiently, rather than the mixed reaction of bio-fuel production and oxygen evolution.

Figure 1:
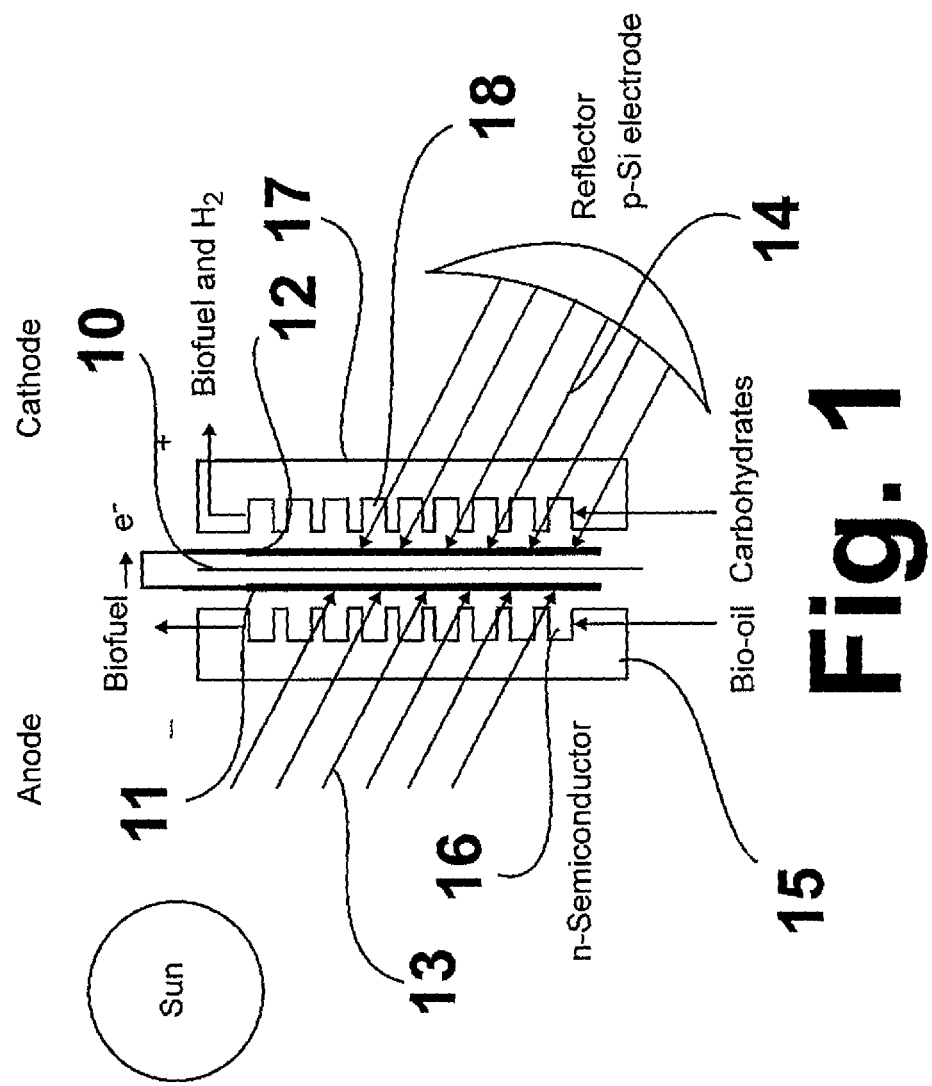
FIG. 1 is a diagram showing a photo-electro-refining apparatus in accordance with one embodiment of this invention.

FIG. 1 shows a photoelectrochemical cell employing a fluidized system for conversion of bio-oil to biofuel in accordance with one embodiment of this invention comprising a proton exchange membrane 10 disposed between an anode electrode 11 and a cathode electrode 12, both of which electrodes are photoelectrodes which respond when exposed to sunlight, shown as arrows 13 and 14. Disposed adjacent the anode electrode is an anode plate element 15, which is light transmissive, and which forms a plurality of anode flow channels 16 for receiving bio-oil. Similarly, disposed adjacent the cathode electrode is a cathode plate element 17, which is also light transmissive, and which forms a plurality of cathode flow channels 18 for receiving carbohydrates. Using a fluidized system helps to remove products and ameliorate mass transfer limitations.

Figure 2:
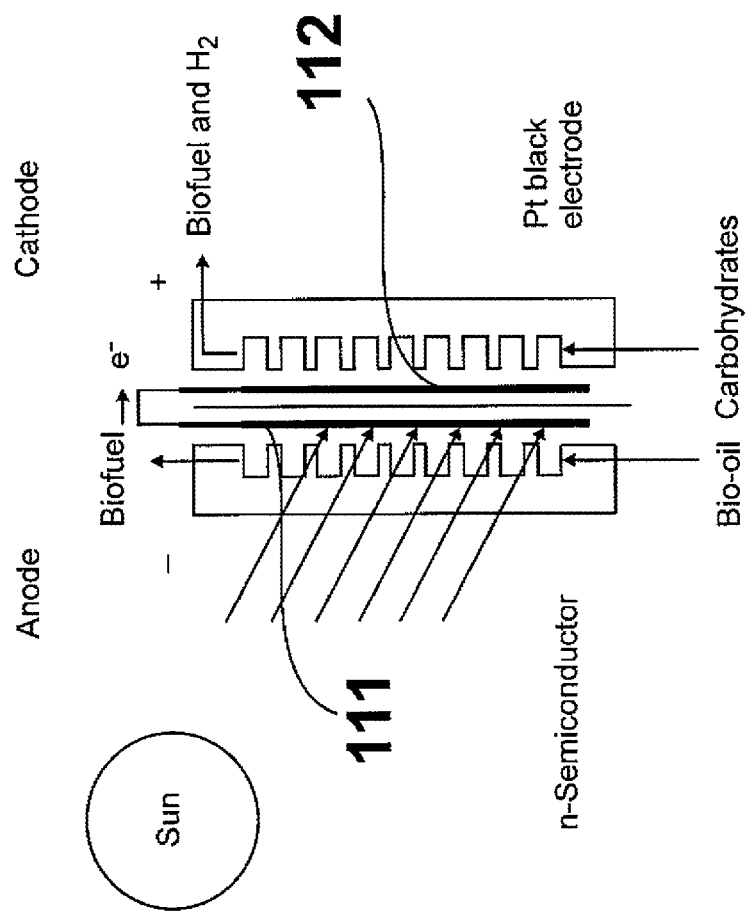
FIG. 2 is a diagram showing a photo-electro-refining apparatus in accordance with another embodiment of this invention.
Figure 3:
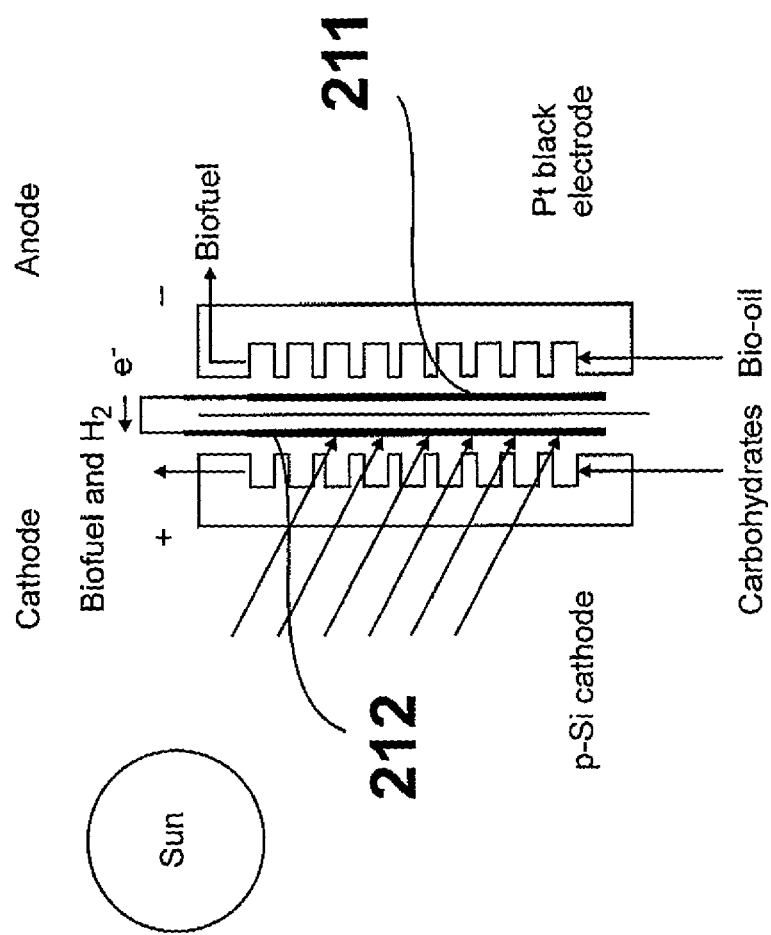
FIG. 3 is a diagram showing a photo-electro-refining apparatus in accordance with yet another embodiment of this invention.

In accordance with one embodiment of this invention, as shown in FIG. 2, only one of the electrodes, the anode electrode 111, of the electrochemical cell is a photoelectrode exposed to sunlight, and the other electrode, the cathode electrode 112, is a Pt black electrode. In accordance with yet another embodiment as shown in FIG. 3, the cathode electrode 212 is the photoelectrode exposed to sunlight and the anode electrode 211 is a Pt black electrode. In accordance with still another embodiment of this invention, neither electrode is a photoelectrode as shown in FIG. 4. The key to each of these systems for bio-oil treatment is the reaction driving force, which is solar power as shown in FIGS. 1-3 and external electricity as shown in FIG. 4, which could also be provided by solar cells.

In accordance with one preferred embodiment of this invention, the light transmissive anode plate element with flow channels is made from quartz glass, which allows short wavelength sunlight to pass through, because the anode semiconductor has a large energy gap $E_g$, ($E_g$>2 ev). In accordance with another embodiment, the plate material is plexiglass. Similarly, the light transmissive cathodeplate element is preferably made from quartz glass. Other light transmissive materials may also be used to form the anode plate element, and such materials are deemed to be within the scope of this invention. The large energy gap materials absorb short wavelength sunlight, have high corrosion resistance, and have high oxygen evolution overpotential. Table 1 lists a number of anode catalyst materials suitable for use in this invention.

TABLE 1

Examples of high oxygen overpotential materials

| Anode | Value (V) | Conditions |
| --- | --- | --- |
| $PbO_2$ | 1.9 | 1M $H_2SO_4$ |
| $SnO_2$ | 1.9 | 0.5M $H_2SO_4$ |
| $TiO_2$ | 2.2 | 1M $H_2SO_4$ |
| Ti/boron-doped diamond | 2.7 | 0.5M $H_2SO_4$ |

Wide band gap semiconductors, such as $TiO_2$, have the appropriate band edge energies for fat acid oxidation and have good photoelectrochemical stability. Under illumination, the absorption of light by a semiconductor results in promotion of an electron from a lower occupied energy band (the valence band) into a higher unoccupied energy level (the conduction band), leaving a hole in the valence band upon departure of the electron. The electron-hole pair can recombine after it reacts with electrolyte, resulting in the conversion of the light energy to chemical energy.

The photoelectrodes employed in the photoelectrochemical cell comprise photo electro-catalyst particles bound together by a proton exchange polymer or polymer electrolyte, such as NAFION® or phosphoric acid doped poly(2,5) benzimidazole (ABPBI). The electrolyte acts as a gas separator, water container, proton exchanger, and water transporter. The catalyst layer contains ionomer and n-type or p-type semiconductors, preferably n-$TiO_2$ and p-Si. The ionomer of the polymer electrolyte in the catalyst layer acts as a capillary channel to transport water to the catalyst surface and proton conductor to transport protons between the photoelectrodes.

The photo electro-catalyst employed in the photoanode for bio-oil treatment must exhibit high oxygen evolution overpotential with n-type semiconductor properties. Suitable catalysts include, but are not limited to, $SnO_2$, $PbO_2$, $TiO_2$, and Ti/boron-doped diamond. The catalysts may be modified by the addition of up to about 20% by weight of a metal or metals, such as Ag, to ensure that the semiconductor is an n-type semiconductor with high oxygen evolution overpotential and to increase the decarboxylation rate of the fat acid.

The photo electro-catalyst employed in the photocathode is a low $E_g$ ($E_g$<2 ev) p-type semiconductor. $H_2$ evolution is at low voltage and the photocathode exhibits good stability at the $H_2$ potential. Suitable semiconductors for the photocathode include, but are not limited to, p-Si, p-CdSe, P-CdTe, p-InP, and p-$CuInSe_2$.

As previously indicated, the anode semiconductor material is selected from the group consisting of $TiO_2$, $SnO_2$, $PbO_2$, and combinations thereof to which metal may be added to ensure that the semiconductor is n-type. The anode semiconductor may be produced by mixing a semiconductor catalyst with 20% by weight NAFION and 10% by weight TEFLON® emulsions to form a slurry. A fine nickel mesh is dip-coated with the slurry and room dried, after which the dried coated mesh is sintered, typically at temperatures greater than about 400° C., depending on the materials. Similarly, on the cathode side, p-Si powder is mixed with 20% by weight NAFION and 10% by weight TEFLON emulsions to form another slurry with which a nickel mesh is coated. The coated mesh is room dried and then sintered at a temperature of about 300° C. The anode and cathode electrodes then are sandwiched with a proton exchange membrane in the middle and hot-pressed at about 120° C.

The catalyst layer of the electrodes must be partially hydrophilic and hydrophobic. Bio-oil product is totally hydrophobic and bio-oil is partially hydrophilic due to the presence of the acid COOH group and the carbohydrate OH group. With the catalyst hydrophilic/hydrophobic properties, the partial hydrophilic bio-oil preferably adsorbs on the catalyst surface.

In accordance with one embodiment of this invention, semiconductor powders are mixed with NAFION ionomer and TEFLON emulsion to produce a photoelectrode assembly. This design eliminates light energy loss due to a thick electrolyte layer. An electrically conductive polymer, such as polyaniline (PANI) and polypyrrole, may be used as a binder and electron-conductor layer. The electrically conductive and proton conductive polymer may be made from polyaniline, which is fully protonated, for example, PANI-camphorsulfonic acid (PANI-$CSA_{0.5}$).

EXAMPLE I

In this example, a photoanode is produced by dissolving silver nitrate in water as a 100 ml 1% (W/W) solution and mixing 0.2 g $TiO_2$ into the solution (Ag:$TiO_2$ (mole ratio)=1:3). The solution is titrated with 1% $NaBH_4$ (0.1 g $NaBH_4$). The suspension is filtered and washed and the powder dried at 450° C. for about 2 hours. The powder is then ground and mixed with isopropanol and water with 20% NAFION and 10% TEFLON emulsion to produce an ink. The ink is applied to a nickel mesh, producing a coated nickel mesh, which is then room-dried and heated to 120° C. Similarly, a photocathode may be made using a p-type semiconductor in place of n-$TiO_2$.

EXAMPLE II

In this example, $TiO_2$ is treated with $TiCl_4$ solution, producing a $TiCl_4$-modified $TiO_2$, which is sintered at 450° C. to produce a Ti-rich $TiO_2$ (n-type) semiconductor powder. The powder is mixed with isopropanol and a 20% NAFION emulsion and 10% TEFLON emulsion to form an ink solution. The ink is then applied to a nickel mesh, producing a photoanode.

EXAMPLE III

In this example, the 20% NAFION is replaced with sulfonated polyaniline, i.e. polyaniline-camphorsulfonic acid (PANI-$CSA_{0.5}$). Polyaniline powder is mixed with camphorsulfonic acid to form PANI-$CSA_{0.5}$, which is then dissolved in m-cresol. The solution is then added to $TiO_2$ powder to form an ink (70% semiconductor catalyst and 20% PANI-$CSA_{0.5}$ and 10% TEFLON emulsion).

EXAMPLE IV

In this example, dye is applied to the photosensitive semiconductor powders to increase light absorption. Porphyrins are one of the photosensitizers. Zinc tetraphenylporphyrin is dissolved in isopropanol with water and mixed with the ink of Examples 1 or 2, resulting in dye being embedded in the semiconductor powders.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for producing a biofuel with an electrochemical device comprising a proton exchange membrane disposed between an anode electrode and a cathode electrode, an anode plate adjacent to said anode electrode and forming at least one anode flow channel between said anode plate and said anode electrode, and a cathode plate adjacent to said cathode electrode and forming at least one cathode flow channel between said cathode plate and said cathode electrode, the method comprising the steps of:
   introducing a bio-oil into said at least one anode flow channel;
   introducing a carbohydrate into said at least one cathode flow channel;
   oxidizing said bio-oil, producing said biofuel;
   migrating protons from said anode electrode to said cathode electrode, producing migrated protons; and
   at least one of reducing said migrated protons to hydrogen and reacting said migrated protons with said carbohydrate, producing hydrogen and carbon-hydrogen biofuel.

2. The method of claim 1, wherein said electrochemical device is powered by one of solar power and external electricity.

3. The method of claim 2, wherein said external electricity is generated using solar cells.

4. The method of claim 1, wherein at least one of said anode electrode and said cathode electrode is a photoelectrode.

5. The method of claim 4, wherein at least one of said anode plate and said cathode plate is light transmissive.

6. The method of claim 4, wherein said photoelectrode comprises a photo electro-catalyst and an electrically conductive and proton conductive polymer.

7. The method of claim 6, wherein said photo electro-catalyst comprises an ionomer and one of an n-type semiconductor and a p-type semiconductor.

8. The method of claim 1, wherein said photoelectrode is a photoanode and said photo electro-catalyst comprises a compound selected from the group consisting of $PbO_2$, $SnO_2$, $TiO_2$, Ti/boron-doped diamond, and combinations thereof.

9. The method of claim 7, wherein said n-type semiconductor is n-$TiO_2$ and said p-type semiconductor is p-Si.

10. The method of claim 8, wherein said photo electro-catalyst comprises up to about 20% by weight of a metal.

* * * * *